(12) United States Patent
Grefenstein et al.

(10) Patent No.: US 10,766,236 B2
(45) Date of Patent: Sep. 8, 2020

(54) MULTILAYER SEALING FILM AND FILM LAMINATE COMPRISING A MULTILAYER SEALING FILM

(71) Applicant: Constantia Pirk GmbH & Co. KG, Pirk (DE)

(72) Inventors: Achim Grefenstein, Altrip (DE); Werner Geitner, Weiden (DE); Ingo Geillersdörfer, Mantel (DE)

(73) Assignee: Constantia Pirk GmbH & Co. KG, Pirk (DE)

( * ) Notice: Subject to any disclaimer, the term of this patent is extended or adjusted under 35 U.S.C. 154(b) by 0 days.

(21) Appl. No.: 16/080,935

(22) PCT Filed: Mar. 14, 2016

(86) PCT No.: PCT/EP2016/055406
§ 371 (c)(1),
(2) Date: Aug. 29, 2018

(87) PCT Pub. No.: WO2017/157410
PCT Pub. Date: Sep. 21, 2017

(65) Prior Publication Data
US 2019/0091981 A1    Mar. 28, 2019

(51) Int. Cl.
*B65D 41/02* (2006.01)
*B32B 27/32* (2006.01)
(Continued)

(52) U.S. Cl.
CPC ............... *B32B 27/32* (2013.01); *B32B 3/30* (2013.01); *B32B 7/12* (2013.01); *B32B 27/08* (2013.01);
(Continued)

(58) Field of Classification Search
CPC .. B32B 27/32; B32B 3/30; B32B 7/12; B32B 27/08; C09J 7/30; C08J 5/18; C09K 3/10; B65D 75/26
(Continued)

(56) References Cited

U.S. PATENT DOCUMENTS

2005/0247960 A1    11/2005    Rim et al.
2011/0293204 A1    12/2011    Plourde
(Continued)

FOREIGN PATENT DOCUMENTS

EP    0618070 A1    10/1994
EP    0715952 A2    6/1996
(Continued)

OTHER PUBLICATIONS

International Prelliminary Report on Patentability Application No. PCT/EP2016/055406 Completed: Sep. 19, 2017; dated Feb. 22, 2018; 7 Pages.
(Continued)

*Primary Examiner* — J. Gregory Pickett
*Assistant Examiner* — Niki M Eloshway
(74) *Attorney, Agent, or Firm* — Whitmyer IP Group LLC (57) ABSTRACT

In order to improve the sealing properties and the sliding properties of a sealing film, surface structures are provided on a first side of the sealing film, the greatest thickness of the sealing film being at least 10% greater than the smallest thickness of the sealing film and the greatest lateral extension of the surface structures being less than 500 µm. A slip additive is added to the sealing film in a maximum quantity that results in an S-value of less than 10,000, preferably less than 5,000, in order to achieve a COF relative to steel of dynamically less than 0.3, preferably less than 0.27, and statically less than 0.35, preferably less than 0.3, with the (Continued)

side comprising the surface structures, irrespective of an addition of an antiblock additive to the sealing film.

20 Claims, 6 Drawing Sheets

(51) Int. Cl.
| | | |
|---|---|---|
| *B32B 3/30* | (2006.01) | |
| *C08J 5/18* | (2006.01) | |
| *C09J 7/30* | (2018.01) | |
| *B32B 7/12* | (2006.01) | |
| *B32B 27/08* | (2006.01) | |
| *B65D 75/26* | (2006.01) | |
| *C09K 3/10* | (2006.01) | |
| *B65D 51/00* | (2006.01) | |

(52) U.S. Cl.
CPC ............... *B65D 75/26* (2013.01); *C08J 5/18* (2013.01); *C09J 7/30* (2018.01); *C09K 3/10* (2013.01); *B32B 2250/03* (2013.01); *B32B 2250/242* (2013.01); *B32B 2307/31* (2013.01); *B32B 2307/514* (2013.01); *B32B 2307/746* (2013.01); *B32B 2307/75* (2013.01); *C08J 2323/04* (2013.01); *C08J 2323/06* (2013.01)

(58) Field of Classification Search
USPC ............................................ 220/62.11, 359.3
See application file for complete search history.

(56) References Cited

U.S. PATENT DOCUMENTS

| | | | | |
|---|---|---|---|---|
| 2012/0101201 | A1* | 4/2012 | Townsend | ............ C07C 233/05 524/232 |
| 2014/0065382 | A1* | 3/2014 | Koehn | .................. B29C 48/21 428/200 |
| 2015/0140303 | A1* | 5/2015 | Martin Gracia | ........ B32B 27/32 428/216 |

FOREIGN PATENT DOCUMENTS

| | | |
|---|---|---|
| EP | 1340694 A2 | 9/2003 |
| EP | 2149447 A1 | 2/2010 |
| EP | 2537770 A1 | 12/2012 |
| EP | 2799234 A1 | 11/2014 |
| FR | 2753996 A1 | 4/1998 |
| FR | 2753997 A1 | 4/1998 |
| JP | H0524158 A | 2/1993 |
| JP | 2000191029 A | 7/2000 |
| JP | 2003181962 A | 7/2003 |
| WO | 2006096894 A1 | 9/2006 |

OTHER PUBLICATIONS

International Search Report & Written Opinion Application No. PCT/EP2016/055406 Completed: Dec. 8, 2016; dated Dec. 16, 2016 13 Pages.

Translation of Internation Search Report Application No. PCT/EP2016/055406 Completed Date: Dec. 8, 2016; dated Dec. 16, 2016 3 Pages.

* cited by examiner

MULTILAYER SEALING FILM AND FILM LAMINATE COMPRISING A MULTILAYER SEALING FILM

TECHNICAL FIELD

The present teaching relates to a multilayer sealing film consisting of a sealable polymer, in particular a polyolefin or a mixture comprising a polyolefin, having a layer thickness in the range of 10 μm to 100 μm, preferably 10 μm to 80 μm, and very particularly preferably in the range of from 20 μm to 70 μm. The present teaching further relates to a film laminate consisting of a substrate layer and a sealing layer of the multilayer sealing film according to the present teaching bonded thereto, and to packaging comprising a film laminate of this kind.

BACKGROUND

A multilayer sealing film for a sealing layer is manufactured for example by means of blown film extrusion or flat film extrusion. The film laminate comprising a sealing layer consisting of a sealing film for producing packaging, such as a bag, is generally produced by means of lamination (i.e., bonding by means of an adhesive layer) of a plurality of films. It is likewise known to manufacture the film laminate by means of coextrusion, the multilayer sealing film being coextruded directly from the melt onto a substrate layer of the film laminate. When producing sealing films from blown polyethylene (PE) (typical blown film) or cast polypropylene (PP) (typical cast film), according to the present prior art what are known as slip additives and/or antiblock additives are added. Said additives have the task of making the usually very dull polyolefins (such as PE or PP) smoother, so that said polyolefins can slide better over the metal surfaces of the packaging machines or against themselves during subsequent processing. If this does not occur, undesired plant outages and/or wrinkled sealed seams or leaky packaging may result.

Typically, coefficients of friction (COF) of the sealing layer relative to steel in the range of 0.15 to 0.30, and of the sealing layer with respect to itself in the range of 0.2 to 0.4, are required for processing film laminates of this kind in packaging machines. In particular when processing the film laminates into bags, known as flow packs, in FFS (form fill seal) facilities, the coefficient of friction with respect to steel is a crucial quality feature of a packaging laminate.

The coefficients of friction specified in the present application are determined using the following test specification:

On a test block of dimensions 66×60×16 mm and having a weight of 500 g, a sample of a wrinkle and fold-free sealing film is clamped on one side of the test block (66×60 mm). In this case, the surface of the film to be tested must of course be oriented outwards. For the purpose of clamping, the sample of the film may be larger than the dimensions of the side of the test block. In order to measure the coefficients of friction with respect to steel, the side of the test block on which the film is clamped is placed on a steel table. The test block is then pulled over the steel table and the force required therefor is measured. The coefficient of friction is then determined as the ratio of the measured force and the weight force of the test block (500 g). In order to measure the coefficients of friction of the sealing layer with respect to itself the same procedure is followed, only a wrinkle and fold-free film is also clamped (with the side to be tested facing outwards) on the test bench, on which film the test block is placed. Using a tensile testing machine, the test block is pulled over the base at a constant speed of 150 mm/min over a measuring distance of 50 mm, and the tensile force is measured.

In the process, a distinction is usually made between what is known as the static coefficient of friction, resulting from the maximum force before the test block moves, and what is known as the dynamic coefficient of friction. Said dynamic coefficient of friction results from the almost constant, average force during the constant, smooth movement of the test block. Films that are too dull move only jerkily and therefore cannot be measured, since the forces fluctuate too much. Films of this kind are unusable in practice.

In order to achieve said coefficients of friction, according to the prior art slip additives and/or antiblock additives are added to the sealing film. Antiblock additives are added in large quantities, well in the region of 1000 ppm. Slip additives are used in the sealing film in slip additive concentrations having an S-value of 16,000 to 25,000. The S-value is defined as the product of the thickness of the sealing film and the content of slip additive in ppm (parts per million). In the case of a multilayer film, the S-value of the film is generally calculated by calculating the S-value of each individual layer (content of slip additive in the layer x thickness of the individual layer), and the S-values of the individual layers are added to make the S-value of the film. This is equivalent to determining an average slip additive content of the film in ppm (average of all the layers), weighted according to the layer thicknesses of the layers, and multiplying by the overall thickness of the film.

Oleamides or, now preferably, ecrucamides are generally used as slip additives, which amides migrate outwards, out of the sealing film, over time and settle on the surface of the sealing film and function there as a sliding film. The most significant disadvantage of these products is that said slip additives migrate, as a result of which the following disadvantages may occur:

The sliding friction of the PE or PP sealing film changes, as the temperature increases, owing to improved solubility of the slip additives in the PE or PP, as a result of which the processing conditions of a film laminate comprising a sealing film of this kind as the sealing layer change. This may make it significantly more difficult to process film laminates of this kind (in a packaging machine) or sealing films of this kind (in a lamination process).

The sliding friction changes, following lamination of the film laminate, due to migration of the slip additives out of the sealing film and into the adhesive and/or lamination partner, as a result of which the processing conditions may again change. This may make it significantly more difficult to process film laminates of this kind.

The lamination partner of the sealing film, e.g., BOPET (biaxially-oriented polyethylene terephthalate) or BOPP (biaxially-oriented polypropylene), becomes smoother due to absorbing the slip additive. This may lead to the film laminate no longer being able to be transported in the packaging facility, as a result of which subsequent processing would be impossible.

The migration of the slip additives is also the reason why the S-value for a multilayer film is calculated as set out above. Equalization of the concentrations of slip additive in the individual layers of the sealing film is initiated very quickly due to the migration of the slip additives, and therefore only one S-value can now be assumed for the entire sealing film.

Antiblock additives are usually mineral fillers (for example silicates or talc), the addition of which increases the surface roughness of the sealing film. Although antiblock agents tend not to migrate but cannot sufficiently reduce the coefficients of friction (COF) of the sealing film, and thus the sliding properties, alone. Whereas pure PE has a COF of 0.5 to over 1 (complete blocking), using antiblock additives alone, it is possible to achieve minimal coefficients of friction of 0.3 with respect to steel. However, this is also only the case at high addition concentrations and reduced transparency of the resulting sealing film, which is generally not desirable. Therefore, the addition of slip additives was so far considered necessary in order to achieve the desired low COF. Low concentrations of slip additive can be compensated for by additionally adding antiblock additives in order to nonetheless achieve a low COF. This can be derived from WO 98/37143 A1 for example, in which a multilayer film comprising a slip additive and an antiblock additive is disclosed. A low S-value of the film is compensated for therein by a high concentration of antiblock additive in the region of ≥1000 ppm.

When producing packaging in the form of bags, a film laminate is often folded and welded or sealed to form a bag, as described above. In this case, the film is typically a multilayer laminate, e.g., consisting of a transparent outer layer, e.g., of BOPET (biaxially-oriented polyethylene terephthalate) or BOPP (biaxially-oriented polypropylene), an inner sealing layer made of a sealable polymer in the form of a sealing film as described above, e.g., of PE (polyethylene) or PP (polypropylene), and an optional intermediate barrier layer, e.g., of aluminum of metallized plastics material (e.g., metallized PET). The sealing or welding is typically carried out, in a well-known manner, between temperature-controlled sealing jaws that are pressed together, as a result of which the sealing layer of the film fuses and establishes a connection upon subsequent cooling. In this context, sealable therefore means that the melting temperature of the sealing layer allows for sealing. A wide range of materials are used as the material for the sealing layer, which materials are intended to be meltable and able to be pressed together at typical sealing temperatures of over 100° C. This requirement leads to various mixtures and co-extrudates of LDPE (low density polyethylene), LLDPE (linear low-density polyethylene), EVA (ethylene-vinyl acetate) and similar materials. However, folding the film results in different material thicknesses in the overlap region, which may lead to incomplete sealed seams during sealing, as a result of which the bag produced forms undesired air channels, for example.

Figure 1:
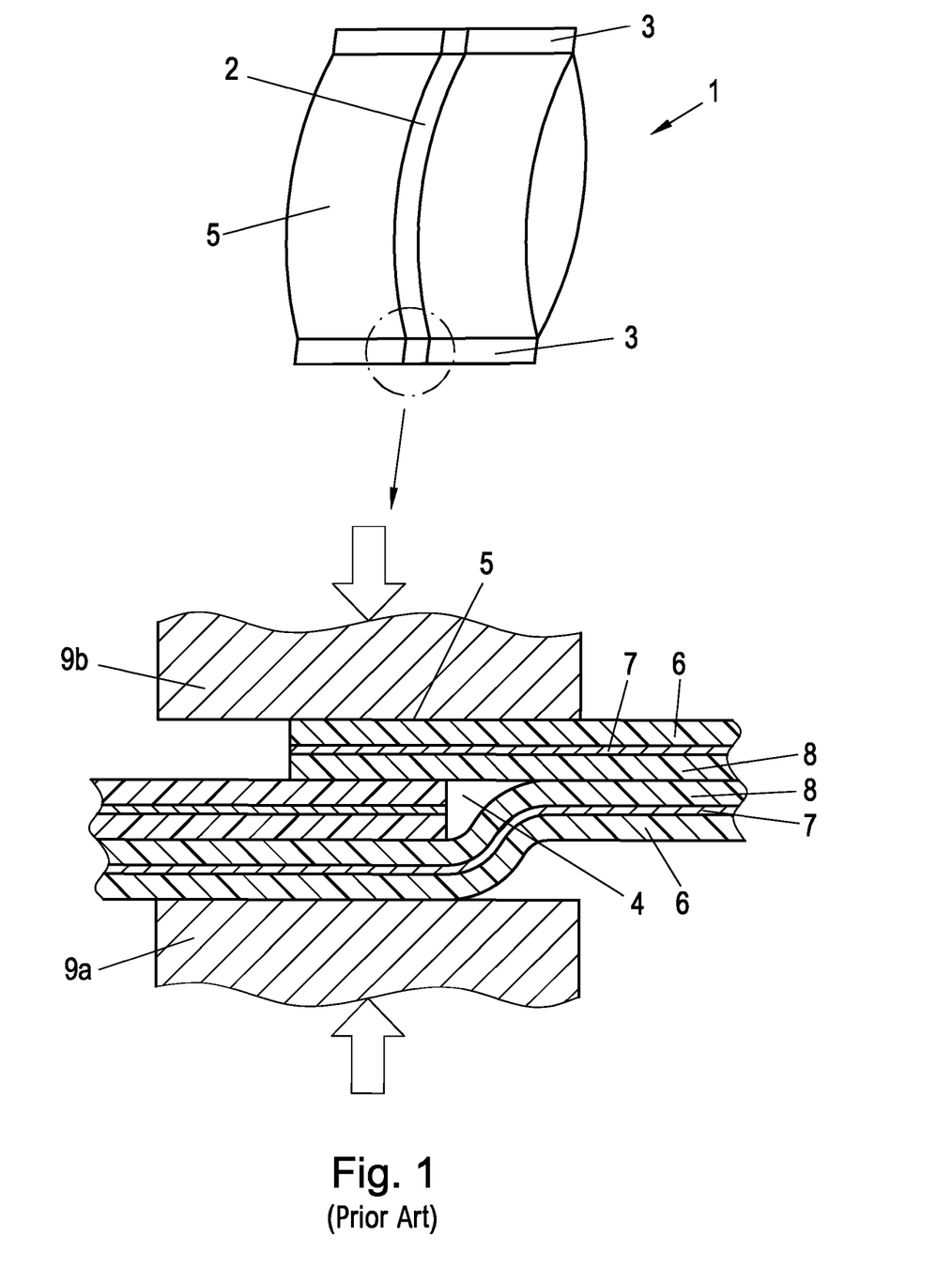
FIG. 1 shows a packaging bag according to the prior art.

This is shown schematically in FIG. 1, on the basis of the example of a bag 1, in this case a vertical tubular bag. The film of the bag 1 is first folded together, lengthwise, into a tube and sealed along the longitudinal seam 2. The tube is sealed at the upper and lower end of the bag 1 by a transverse seam 3 in each case in order to form a bag 1, as a result of which the filling material located therein is enclosed in the bag 1. The overlap region of the two sealed seams, i.e., between the longitudinal seam 2 and the transverse seam 3, is shown enlarged in FIG. 1. Owing to the different material thicknesses along the transverse seam 3, it is possible that the overlapping film 5, in particular in the region of overlapping sealed seams, may not be able to be completely pressed together by the sealing jaws 9a, 9b, as a result of which an air channel 4 may be formed in this region when the transverse seam 3 is sealed, with the result that the bag is leaky. The film 5 is formed in this case as a three-layer laminate comprising an outer BOPET layer 6, an intermediate layer 7 made of aluminum, and an inner sealing layer 8 made of PP. Similar problems also arise in other types of bag, such as cross bottom bags, upright bags, block bottom bags, etc., in the overlap region of a plurality of film layers.

Similar problems may arise when sealing what are known as film-like lids (generally consisting of an aluminum base layer and a sealing layer applied thereto) on the edge of plastics containers, as are conventional in yoghurt packaging, for example. Film-like lids of this kind are generally made of aluminum, plastics material or paper, to which a sealing layer is applied. On account of manufacturing tolerances when producing the plastics containers and/or when producing the film laminates of the lids, differences in thickness may result here too, which differences cannot be compensated for by the pressure of the sealing jaws during sealing, and this may result in the packaging being leaky.

In order to reduce this problem when sealing, special materials for use as a sealing layer have already been developed, but said materials are relatively expensive and are therefore used hesitantly in the packaging industry.

It is not possible to reduce the thickness of the sealing layer, since the sealing layer must have a certain degree of compressibility. In order to be able to make the sealing layer thinner, special polymers are often mixed into the material of the sealing layer, but this again increases the cost of the material.

EP 2 537 770 A1 describes a film material comprising a foamed polymer layer, in particular for producing bags for granular bulk material. The foamed polymer layer is intended to prevent the granular bulk material from showing through at the outer bag surface.

US 2011/0293204 A1 describes a foamed, compressible polymer layer as a sealing layer, in order to improve the sealing properties.

US 2005/0247960 A1 in turn describes a film comprising an embossed sealing layer for forming a bag for vacuum packaging, the embossing forming gaps which form air channels when vacuum packing takes place, through which channels the air can be better suctioned out. A visible pattern, e.g., in the form of letters or any desired shape, may be provided as the embossing. In order for the embossing to be easily visible to the naked eye and in order to ensure the function as an air channel when vacuum packing takes place, the embossing must be relatively deep, generally substantially deeper than 100 µm. The air channels formed must be >~1 mm wide in order that an expedient volume flow rate for suctioning the air out of the packaging can be achieved.

Embossed sealing layers are also used to prevent cover lids from adhering to one another when stacked one on top of the other, which can lead to problems during processing in processing machines. The embossing creates an air cushion between individual adjacent cover lids, as a result of which the cover lids can be separated easily and reliably. Examples thereof can be found in EP 2 149 447 A1 or WO 2006/096894 A1.

SUMMARY

An object of the present teaching is that of specifying a multilayer sealing film that makes it possible to reduce problems, caused by the addition of slip additives, for setting a coefficient of friction required for the processing, and the problems when sealing such sealing films in the event of differences in thickness arising in the sealing region, without visually impairing the resulting product.

This object is achieved according to the present teaching in that surface structures are made on a first side of the sealing film and a slip additive is added to the sealing film in a maximum quantity that results in an S-value of less than 10,000, preferably less than 5,000, in order to achieve a COF relative to steel of dynamically less than 0.3, preferably less than 0.27, and statically less than 0.35, preferably less than 0.3, with the side comprising the surface structures, irrespective of an addition of an antiblock additive to the sealing film.

The surface structures increase the compressibility of the sealing film, making it possible to better compensate for occurring differences in thickness in the sealing region. Moreover, the amount of material required for the sealing film can be reduced, since the surface structures reduce the average thickness of the sealing film. However, it has also been found that the surface structures having fewer or even no slip additives simultaneously make it possible to also achieve a COF that is favorable for processing the sealing film, irrespective of any antiblock additives that may be present. The surface structures thus make it possible to achieve two mutually independent aims by means of just one measure.

It has in addition surprisingly been found in particular that a sealing film according to the present teaching also has a sufficiently low COF, without or with just a little slip additive, to be processed in packaging machines. In the case of a film laminate according to the present teaching, it is possible to omit such slip additives in the sealing layer, or at least to significantly reduce the required quantity, entirely irrespective of antiblock additives that may be present, as a result of which the disadvantages and problems of such additives mentioned at the outset can be prevented or at least reduced.

It has been found to be advantageous if, owing to the surface structures, the greatest thickness of the sealing film is at least 10% greater than the smallest thickness of the sealing film, and the greatest lateral extension of the surface structures is less than 500 μm, preferably less than 400 μm, very particularly preferably less than 250 μm. In this case, the surface structures are also sufficiently small that they are not perceived as disruptive when viewed with the naked eye, with the result that the sealing film can also be used in a film laminate comprising a sealing film that forms a sealing layer, and a substrate layer that is bonded thereto. As a result, the appearance, perceptible to the naked eye, of a film laminate comprising a sealing film of this kind is not negatively affected.

Due to manufacturing restrictions, the greatest thickness of an embossed plastics film (the sealing film) cannot, at present, be of any desired magnitude. Owing to the flowability of plastics materials and the current necessity to work with cooled embossing rolls on which the plastics material hardens, the technological upper limit for the greatest thickness is currently approximately 300% of the smallest thickness. Provided that this does not lead to optical impairment of the surface, it is, however, also possible to use greater differences in thickness within the scope of the present teaching, in particular if the smallest thickness is measured in punctiform depressions.

The COF of a sealing film embossed according to the present teaching with respect to itself can in particular be significantly reduced when the embossing structures (typically pyramids) are arranged diagonally with respect to the longitudinal direction of the sealing film, the longitudinal direction corresponding to the movement direction of the sealing film in the packaging machine.

The surface structures are advantageously formed as structures that protrude from the first side.

It is very particularly advantageous, however, for the surface structures to be formed as depressions on the first side, since the COF of the sealing film both with respect to steel and with respect to itself can then be sufficiently reduced only by the surface structures.

It is likewise particularly advantageous for the surface structures to be formed having a base surface in the shape of a polygon having at least six sides, since the COF of the sealing film both with respect to steel and with respect to itself can then also be sufficiently reduced only by the surface structures.

Regions without surface structures or regions having different surface structures also make it possible to introduce logos or inscriptions into the sealing film, which is of interest, in particular, in packaging.

For specific applications of the film laminate it is advantageous for the substrate layer to comprise a base layer and a barrier layer, the barrier layer being arranged between the base layer and the sealing layer.

If the sealing film is a PE film manufactured using the blown film extrusion or flat film extrusion method, the sealablity improves still further relative to a blown PE film having a higher MFI.

The film laminate according to the present teaching is used most particularly advantageously for packaging manufactured by folding and sealing the film laminate, and for closing a container by sealing a lid of the film laminate onto an edge of the container.

The present teaching will be described in greater detail in the following with reference to FIGS. 1 to 12, which schematically show non-limiting, advantageous embodiments of the present teaching by way of example. In the drawings.

BRIEF DESCRIPTION OF THE DRAWINGS

DETAILED DESCRIPTION

Figure 2:
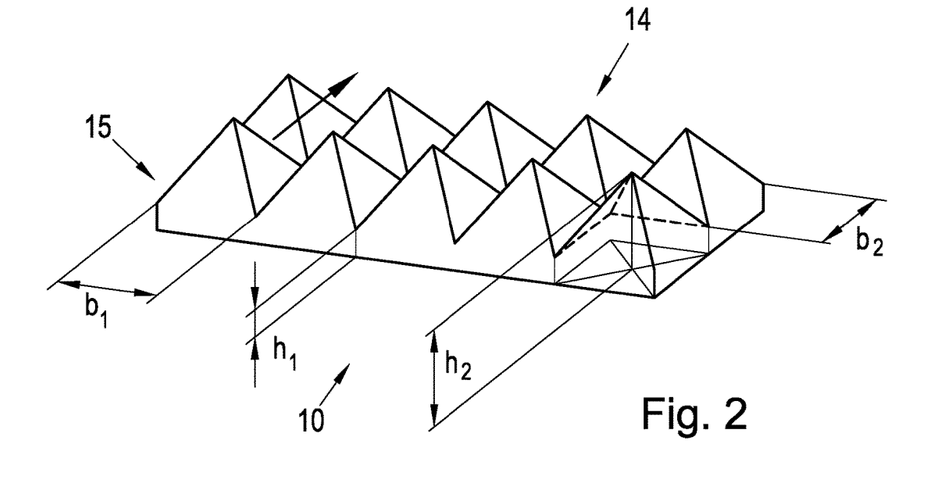
FIGS. 2 to 7 show a sealing film according to the present teaching comprising surface structures.
Figure 8:
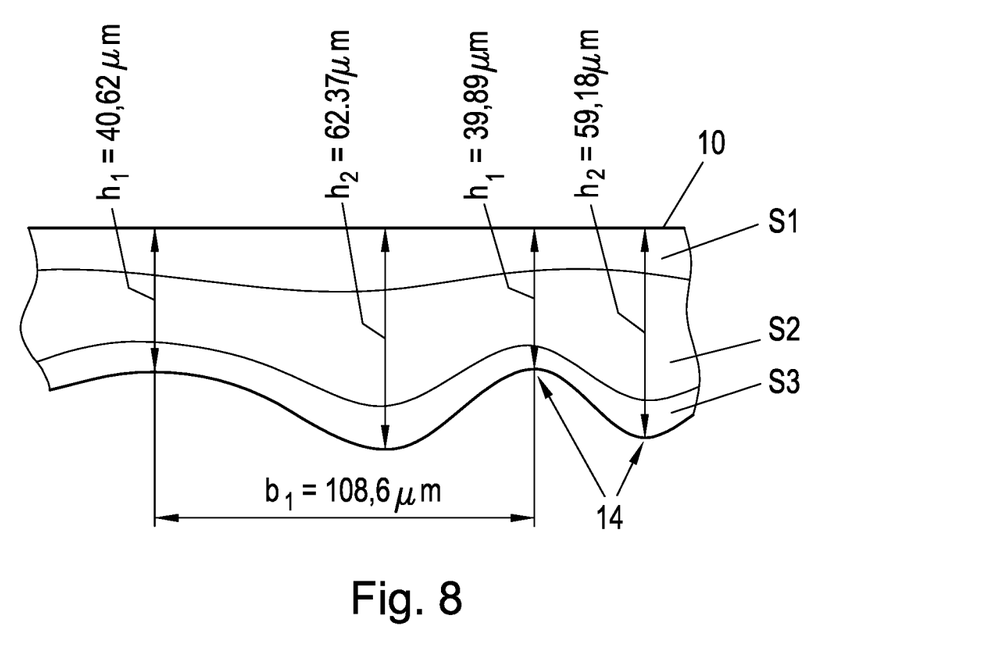
FIG. 8 shows a microtome section through a sealing film according to the present teaching.
Figure 11:
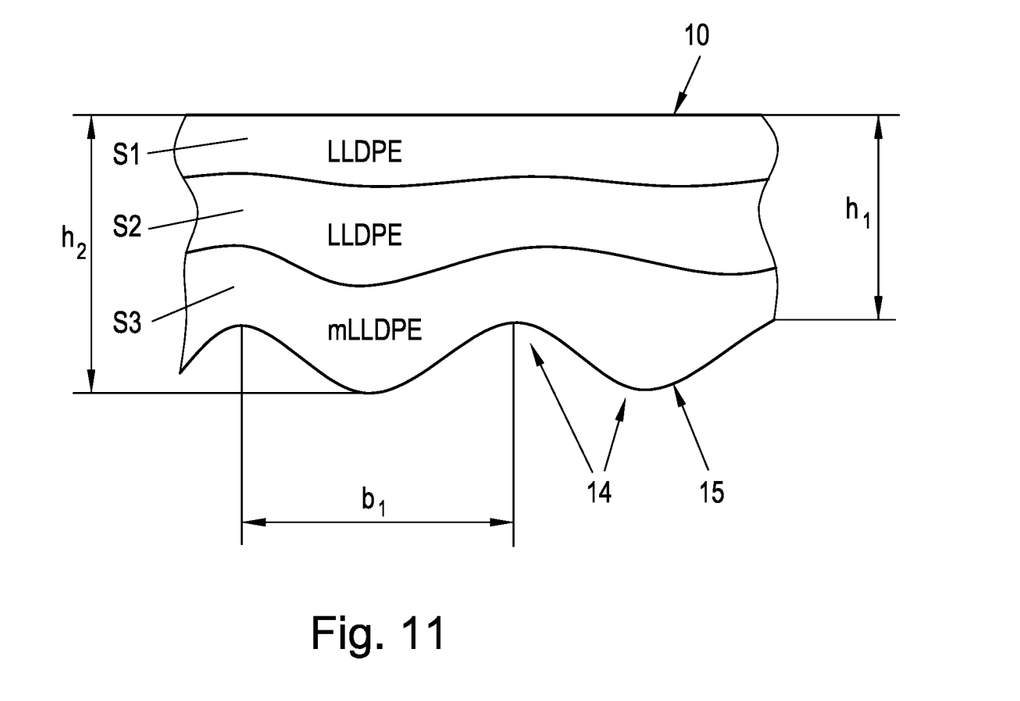
FIG. 11 shows a multilayer sealing film comprising surface structures.

FIG. 2, FIG. 8 and FIG. 11 show a multilayer sealing film 10 according to the present teaching, for example for use as a sealable sealing layer 11 on a film laminate 16 (FIG. 9), for producing packaging, for example bags or closures of containers (known as lids), comprising a plurality of layers S1, S2, S3. The sealing film 10 comprises layers S1, S2, S3 of a sealable polymer, preferably of a polyolefin such as polyethylene (PE) or polypropylene (PP) in the various embodiments available, for example as LDPE (low density polyethylene) or LLDPE (linear low-density polyethylene), or of a mixture comprising a polyolefin of this kind. Mixtures of a polyolefin and a plastomer, i.e., a polyolefin having a particularly low density of less than 0.9 kg/dm$^3$, are also often used in multilayer sealing films 10. The multilayer sealing film 10 may for example be produced in a known manner by means of coextruding the layers S1, S2, S3 or by means of laminating the layers S1, S2, S3. Although the inventive sealing film 10 is shown as a three-layer sealing film 10 in the examples, it should be noted that the number of layers is not restricted to three. Sealing films 10 used today may well comprise five or more layers.

The sealing film 10 has surface structures 14 formed, for example embossed, on a first side 15. The surface structures 14 uniformly deform the layers S1, S2, S3, the layers S3, S2 close to the first side 15 of course being deformed more than the layers S1 on the opposing side, as can be seen in FIGS. 8 and 11. In FIG. 2, the surface structures 14 arranged side by side are arranged transversely to the longitudinal direction (indicated by the arrow) of the sealing film 10. On account of the surface structures 14, the sealing film 10 has a thickness that varies between a smallest thickness $h_1$ and a greatest thickness $h_2$ (FIG. 11). The surface structures 14 comprise lateral extensions $b_1$, $b_2$ in the aerially extending plane of the sealing film 10.

Figure 3:
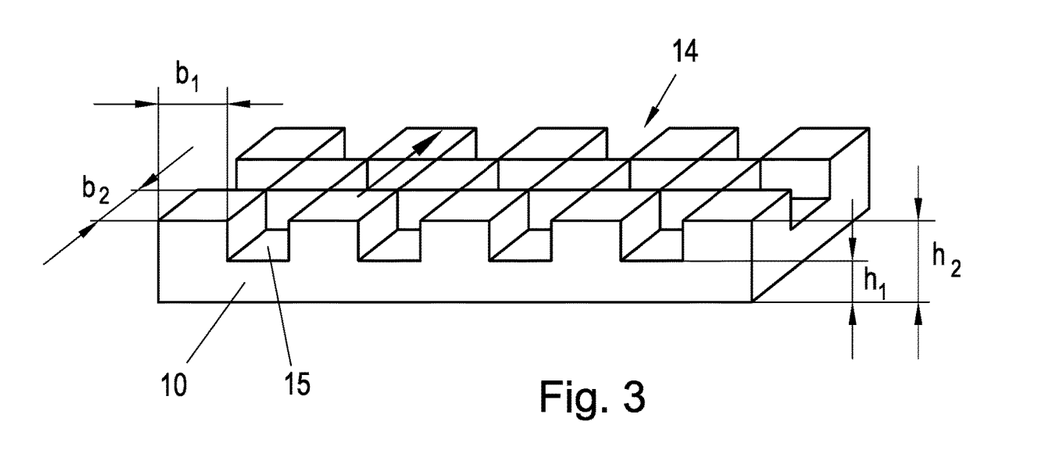
Figure 4:
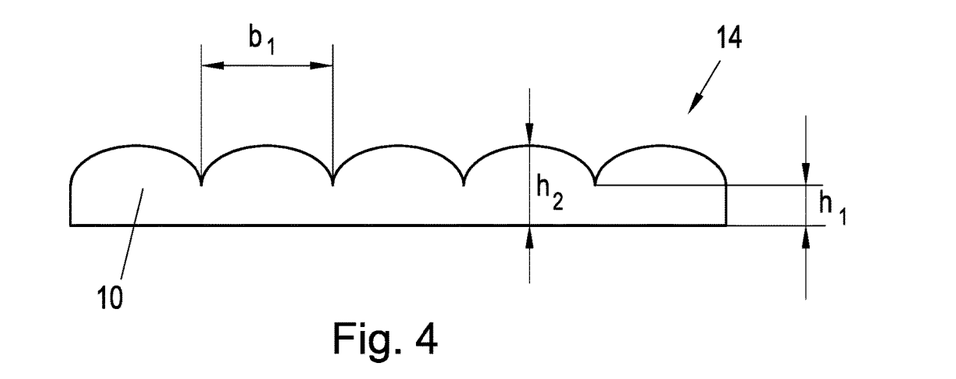

The surface structures 14 can be designed in very different manners, for example as pyramids, as shown in FIG. 2, or as cuboids, as shown in FIG. 3, or as domes, as shown in FIG. 4. In this case, the pyramids of the embodiment according to FIG. 2 do not need to have a square or rectangular base surface, but instead the base surface can in principle be designed as desired.

In the examples of FIGS. 2 to 4, the surface structures 14 protrude from the plane or from the first side 15 of the sealing film 10. Surface structures 14 are also possible, however, that are formed as depressions in the sealing film 10, for example as recessed pyramids, as indicated in a plan view in FIG. 5 and in a section A-A in FIG. 6. In this case, the tip of the pyramid is depressed, proceeding from the first side 15. Here, too, the base surface of the recessed pyramids can in principle be designed in any desired manner. In the embodiment according to FIG. 5, it can furthermore be seen that the surface structures 14 that are positioned side by side are arranged so as to be diagonal to the longitudinal direction (indicated by the arrow) of the sealing film 10.

Figure 7:
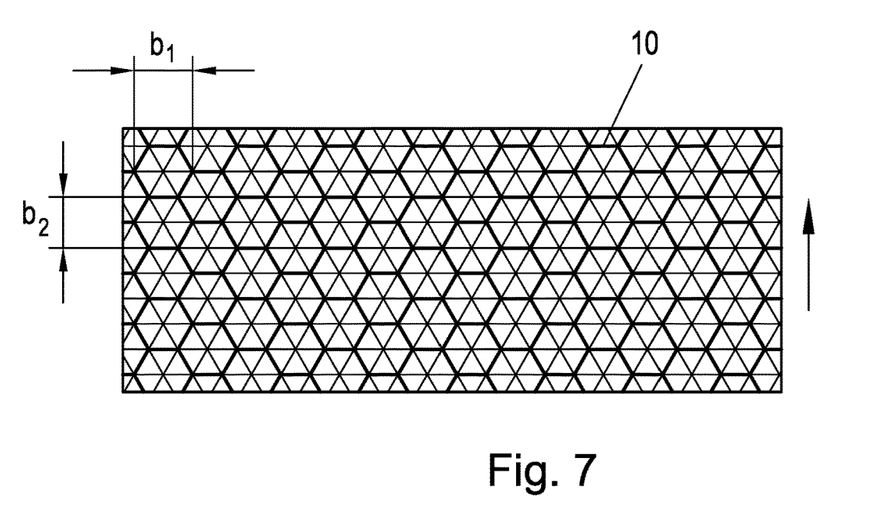

A hexagonal base surface, as shown in FIG. 7, no matter whether as recessed structures or as structures that rise up from the plane, results in particularly advantageous properties of the sealing film 10, as is set out in more detail below.

Shapes of the surface structures 14 other than those shown in FIGS. 2 to 7 are of course also conceivable.

The surface structures 14 can be formed by means of any suitable method, e.g., by embossing the sealing film 10 using embossing rollers following the blown film extrusion or flat film extrusion (off-line method). The surface structures 14 can also be produced in-line, using the heat of fusion of the film production. This can be applied in particular when the sealing film 10 is coextruded directly onto a substrate layer of a film laminate during flat film extrusion. This is also referred to as extrusion coating.

The dimensions of the surface structures 14 are important for the desired properties of the sealing film 10 according to the present teaching. For this purpose, the greatest thickness $h_2$ of the sealing film 10 must be at least 10% greater than the smallest thickness $h_1$ of the sealing film 10, because it is otherwise not possible to displace enough material in the case of overlapping sealed seams. For practical reasons or due to manufacturing-related restrictions, it is advantageous for the greatest thickness $h_2$ to be at most 300% greater than the smallest thickness $h_1$ of the sealing film 10. In particular, the surface structure 14 of the sealing film 10 should not be visible to the naked eye, but should at most be manifested in a more matte homogenous surface of the sealing film 10.

Figure 5:
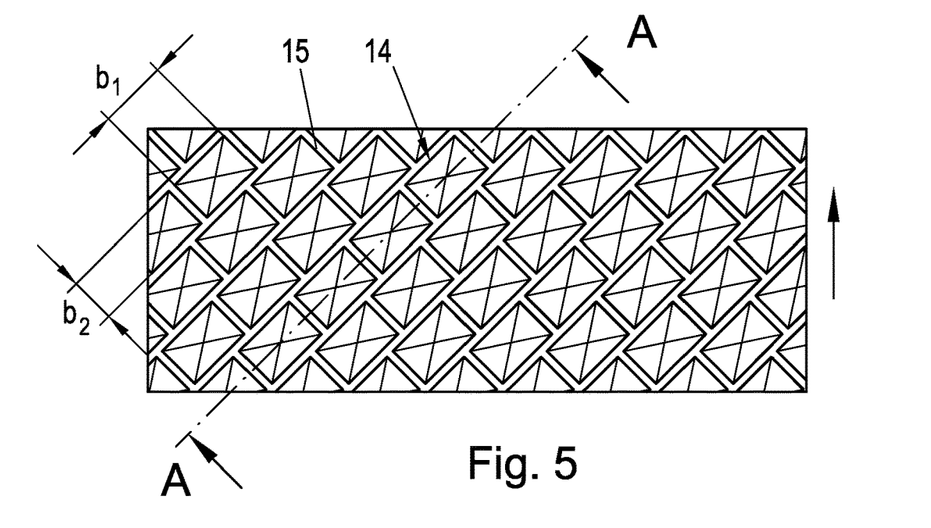

If they are not known, these thicknesses $h_1$, $h_2$ can in practice be determined using the well-known methods of microtomy. In this case, thin sections (microtome sections) of a cutout from the sealing film 10 are produced and are then examined by microscope. FIG. 8 schematically shows a microtome section through a sealing film 10 according to the present teaching. The individual layers S1, S2, S3 of the multilayer sealing film 10 can of course also be seen in the microtome section. The surface structures 14 are shown in an idealized manner in FIGS. 2 to 7. In practice it may of course be the case, simply due to the sample preparation or the fact that a section of this kind is never made exactly in parallel with the geometrical structures, and also on account of the production method (e.g., embossing method), that the desired structures are not represented in the sealing film 10 in an ideal manner, as indicated in FIG. 8. Individual elements of the surface structures 14 in the sealing film 10 also do not need to be directly adjacent to one another, as indicated in FIG. 3 or FIG. 5, for example.

The greatest thickness $h_2$ of the cutout of the sealing film 10 in FIG. 8 is 62.37 µm in this case, and the smallest thickness $h_1$ is 39.89 µm, as a result of which the greatest thickness $h_2$ is 56.4% greater than the smallest thickness $h_1$. It is also possible, however, to determine an average value from the maximum and/or minimum measurable thicknesses on the cutout and to determine therefrom the ratio of the two thicknesses to one another. In the example according to FIG. 8, the average greatest thickness would be $h_{2m}$=60.78 µm ((62.37+59.18)/2), as a result of which the average greatest thickness $h_2$ is 52.4% greater than the smallest thickness $h_1$. The average smallest thickness $h_{1m}$ could of course likewise be determined, and the ratio of the thicknesses thus calculated, e.g., the ratio of the two average thicknesses. The smallest value of the different determination methods can preferably also be used as the basis.

Likewise, the greatest lateral extensions $b_1$, $b_2$ in the surface of the sealing film 10 must be less than 500 µm, preferably less than 400 µm, and most particularly advantageously less than 250 µm in order for the surface structures 14 not to be visible to the naked eye. In the example according to FIG. 8, the greatest lateral extension is $b_1$=108.6 µm. Likewise, an average value, which must then be less than 500 µm, can be formed from a plurality of measured greatest lateral extensions. For the lateral extensions, microtome sections are required in the planes in which the greatest extensions are located in order for it to be possible to determine the greatest lateral extensions $b_1$, $b_2$. However, the greatest lateral extension can also be determined more easily from a microscopic plan view of the surface structures 14 of the sealing film 10 (as in FIG. 5 or FIG. 7).

Since the sealing film 10 is uniformly embossed, it is sufficient per se to examine a small embossed region of the sealing film 10, e.g., two or three surface structures 14 located side by side, using microtome sections. A region of this kind is considered to be representative of the entire sealing film 10 comprising surface structures 14.

It is likewise conceivable for a plurality of microtome sections to be produced from the sealing film 10, and for the thicknesses or the lateral extensions to be determined, as described above, for each individual microtome section. Average values across all microtome sections can then be calculated therefrom, which average values are then used as the smallest thickness, greatest thickness and greatest lateral extension.

The limitation of the greatest lateral extension is important in order that no air pockets and leakiness arises during sealing, and above all in order that the surface structures 14 do not produce an optically disruptive orange-skin effect on the usually highly glossy visible side of the sealing film 10. The surface structures 14 should be sufficiently small as to not cause optical effects that are disruptive to the naked eye.

If the greatest thickness $h_2$ of the sealing film 10 is at least 10% greater than the smallest thickness $h_1$ of the sealing film 10 (optionally the average values thereof), and the greatest lateral extension ($b_1$, $b_2$) of the surface structures 14 (optionally the average values thereof) is less than 500 μm, at the typical thickness of the sealing film 10 in the range of 10 μm to 100 μm the surface structures 14 are not visible to the naked eye, but instead can be identified only under a microscope or magnifying glass. The surface structures 14 are manifested to the naked eye only by a matte, satinized appearance of the embossed surface of the sealing film 10.

The effect of the surface structures 14 during sealing is that the sealing film 10 has an increased compressibility, compared with a conventional substantially smooth sealing film 10, which makes it possible to better compensate, during sealing, for possible differences in thickness. At the same time, the amount of material required for the sealing film 10 can be reduced thereby, since the average thickness of the sealing film 10 comprising surface structures 14 is generally smaller than a conventional smooth sealing film.

However, as a result of the surface structures 14 of the sealing film 10, it is also possible that, irrespective of any antiblock additive that may be present, less slip additive, or even no slip additive, needs to be added in order to achieve a specified advantageous coefficient of friction (COF) of the sealing film 10. On account of the negative properties of the slip additives mentioned at the outset, this is a very particular advantage of the surface structures 14. It has been found that the S-value for the sealing film 10 should be less than 10,000, preferably less than 5,000, in order to at least sufficiently reduce the disadvantages associated therewith. It is very particularly advantageous, however, for the added quantity of slip additive to be zero, i.e., for the sealing film 10 not to contain any slip additive at all. By comparison, conventional PE sealing films, as are used today, have S-values that are typically in the region of 20,000.

For calculating the S-value of a multilayer sealing film 10 comprising surface structures 14, the layer thicknesses D1, D2, D3 prior to the introduction of the surface structures 14 are used. In general, said layer thicknesses D1, D2, D3 are known. If the layer thicknesses D1, D2, D3 are not known they can also be determined from the material properties of the individual layers. The overall thickness D (in μm) of a sealing film 10 prior to the introduction of the surface structures 14 can be easily determined by dividing the measured weight per unit area thereof (usually specified in g/m²) by the density of the layer material (usually specified in kg/dm³) that is known on account of the material. In this case, an average density of the individual layers S1, S2, S3 that is to be determined according to the layer structure of the sealing film 10 should of course be used. The densities of the layer materials can be found in tables or data sheets for example, or are provided by the supplier, and can be assumed to be known. Typical values for the density are 0.915 to 0.935 kg/dm³ for LDPE, 0.90 to 0.93 kg/dm³ for LLDPE, 0.94 to 0.96 kg/dm³ for HDPE, and 0.905 kg/dm³ for PP.

If the layer material of the individual layers S1, S2, S3 is not known either, the layer material can also be determined using conventional lab analytics, for example by means of the known Fourier-transform infrared spectroscopy (FTIR). In addition, the melting point of the individual layer material could also be determined using the known differential scanning calorimetry (DSC) in order to still further narrow down the layer material within a material group. For example, the density of a PE plastics material is often dependent on the melting temperature (see the density ranges above).

It is likewise possible to determine the layer structure of the sealing film 10 using conventional lab analytics, if said layer structure is not known. For example the above-described microtomy (optionally using laser microscopes) is suitable for this. The layer distribution (layer structure) in the sealing layer 10 can be determined from a microtome section. Since the overall thickness D prior to the introduction of the surface structures 14 is known or has been determined, as described, the layer distribution can also be used to determine the layer thicknesses D1, D2, D3 of the individual layers S1, S2, S3 prior to the introduction of the surface structures 14.

It is therefore possible to determine the properties of a sealing film 10, in particular the overall thickness D, thicknesses D1, D2, D3 of the individual layers S1, S2, S3, layer distribution within the sealing film 10, layer material of the individual layers S1, S2, S3 prior to the introduction of the surface structures 14, at an uncertainty of <5%, generally with significantly less uncertainty. This also makes it possible to examine a sealing film 10 for which no information at all is available.

The surface structures 14 thus make it possible, in particular also irrespective of any antiblock additive that may be present in the sealing film 10, to nonetheless achieve a COF that is required for preparing the sealing film 10 or a film laminate comprising a sealing film 10. In particular, this means that, despite the low S-value, no antiblock additive at all needs to be added in order to achieve the desired COF ranges. However, an antiblock additive may nonetheless be added for purposes other than that of achieving the COF. Irrespective of antiblock additive therefore means that the desired COF is achieved by the sealing film 10 regardless of whether or not an antiblock additive is present and in what concentration.

The desired COF range of the sealing film 10 relative to steel is dynamically less than 0.3, preferably less than 0.27, and statically less than 0.35, preferably less than 0.3. A desired COF range of the sealing film 10 relative to steel that is dynamically less than 0.25, preferably less than 0.22, and statically less than 0.3, preferably less than 0.25, is very particularly advantageous. The COF relative to steel is crucial for the processability of the sealing film 10. The COF value relative to itself is in practice rather unimportant for the processability of the sealing film 10, but is sometimes used in order to be able to compare films relative to one another.

The influence of the surface structures 14 on the COF is explained with reference to the following Table 1.

TABLE 1

| No. | Material | Thickness | Embossing | Slip additive | COF steel stat./dyn. | COF sealing film stat./dyn. |
|---|---|---|---|---|---|---|
| 1 | LLDPE C8 | 70 μm | No | 500 ppm | 0.21/0.18 | 0.32/0.25 |
| 2 | LLDPE C8 | 70 μm | No | None | Not measurable | Not measurable |
| 3 | 3-layer film 1/1/1 comprising | 70 μm | No | 350 ppm in all 3 | 0.22/0.19 | 0.34/0.26 |

TABLE 1-continued

| No. | Material | Thickness | Embossing | Slip additive | COF steel stat./dyn. | COF sealing film stat./dyn. |
|---|---|---|---|---|---|---|
|  | LLDPE C4/LLDPE C4/mLLDPE |  |  | layers |  |  |
| 4 | 3-layer film 1/1/1 comprising LLDPE C4/LLDPE C4/mLLDPE | 70 μm | No | 150 ppm in all 3 layers | 0.40/0.39 | 0.45/0.46 |
| 5 | 3-layer film 1/1/1 comprising LLDPE C4/LLDPE C4/mLLDPE | 60 g/m² | Pyramid diagonal, square base surface, diagonal of pyramid 185 μm, lateral extension $b_1/b_2$ = 130 μm, $h_1$ = 55 μm, $h_2$ = 85 μm | None | 0.24/0.18 | 0.74/0.62 |
| 6 | 3-layer film 1/5/1 comprising a mixture of 80% LLDPE C4 and 20% LDPE in all layers | 50 g/m² | Pyramid, hexagonal base surface, lateral extension $b_1$ = 120 μm, $h_1$ = 40 μm, $h_2$ = 60 μm | None | 0.25/0.24 | 0.34/0.35 |

Sealing film no. 1 is a conventional single-layer LLDPE C8 sealing film having a thickness of 70 μm, not comprising any surface structures 14, and comprising ESA (ecrucamide) as the slip additive in a quantity of 500 ppm, resulting in an S-value of 35,000. The high S-value makes it possible to achieve a COF relative to steel and relative to itself that is favorable for processing the sealing film.

The comparative example in the form of the single-layer sealing film no. 2 demonstrates the influence of the slip additive on the COF when no surface structures 14 are embossed in. In this case, the COF can no longer be measured using the above test specification. In the case of a sealing film of this kind, the COF is so high that the test block would jump when the COF is measured, making a measurement impossible. This of course also applies to a multilayer sealing film 10 without surface structures 14 and without slip additive.

Sealing film no. 3 is a three-layer, coextruded sealing film 10 without surface structures 14, as in FIG. 1. Sealing film no. 3 has a layer distribution 1/1/1, i.e., all three layers S1, S2, S3 are of the same thickness D1, D2, D3, in this case, when the sealing film 10 has an overall thickness D=70 μm, a thickness D1, D2 and D3 of 70 μm/3=23.33 μm. LLDPE C4/LLDPE C4/mLLDPE (metallocene LLDPE) are provided as the material of the three layers (in this case C4 denotes, in a known manner, the comonomer, in this case butene C4). In this case, the outermost layer of the sealing film, the COF of which with respect to steel is tested, is the mLLDPE layer. A slip additive, in a concentration of 350 ppm, is added to all three layers S1, S2, S3 of the sealing film 10. The average value of the slip additive concentration, weighted according to the layer thicknesses of the individual layers, is therefore 350 ppm. The S-value of the three-layer sealing film no. 3 is therefore 24,500. On account of the high S-value, the desired range of the COF relative to steel is achieved.

If the S-value is lowered, the COF thus increases, as is demonstrated with reference to sealing film no. 4. In the case of a slip additive concentration of 150 ppm in all three layers, an S-value of 10,500 results and the COF values are far outside the desired range. If the slip additive concentration is reduced further, the COF values thus increase still further. Reducing the slip additive concentration is therefore not expedient in practice or must be compensated for by high or higher concentrations of antiblock additive.

Sealing film no. 5 is a three-layer, coextruded sealing film 10 according to the present teaching comprising surface structures 14, as shown in FIG. 11 for example, having a layer distribution 1/1/1 prior to the introduction of the surface structures 14, i.e., all three layers S1, S2, S3 are of the same thickness D1, D2, D3 prior to the introduction of the surface structures 14. LLDPE C4/LLDPE C4/mLLDPE (metallocene LLDPE) are provided as the material of the three layers S1, S2, S3. In this case, the surface structures 14 are designed as pyramids that protrude from the plane and have a square base surface (diagonals of 185 μm) and a side length of 130 μm. In this case, the pyramids are arranged diagonally to the longitudinal direction of the sealing film 10 (as in FIG. 5). The weight per unit area of sealing film no. 5 is 60 g/m². This weight per unit area of the sealing film can easily be converted into the weight per unit area of the individual layers S1, S2, S3 using the known layer structure 1/1/1 and the known material. The layer thicknesses D1, D2, D3 can then be determined using the weight per unit area of the individual layers S1, S2, S3 and the known densities. The overall thickness then results from the sum of the layer thicknesses D1, D2, D3 of the layers S1, S2, S3. This procedure results, for sealing film no. 5, in an overall thickness D of approximately 65.5 μm prior to the introduction of the surface structures 14. No slip additive is added to sealing film no. 5, resulting in an S-value of 0. No antiblock additive is added either. It can be seen here that the COF relative to steel drops in desired regions, as a result of the surface structures 14, although no slip additives whatsoever are added.

This is all the more remarkable since the outer layer, in which the surface structures 14 are formed, is the very tacky mLLDPE layer. mLLDPE is often used as a self-adhesive surface protection film in industrial application. An mLLDPE layer would cling to steel without additional measures, and it would not be possible to measure the COF at all. The surface structures 14 make it possible to achieve a COF, even of said tacky material relative to steel that is in the desired region, without adding a slip additive. If a slip additive were added up to an S-value of less than 10,000, the COF, in particular relative to itself, could thus also be reduced further still.

Figure 6:
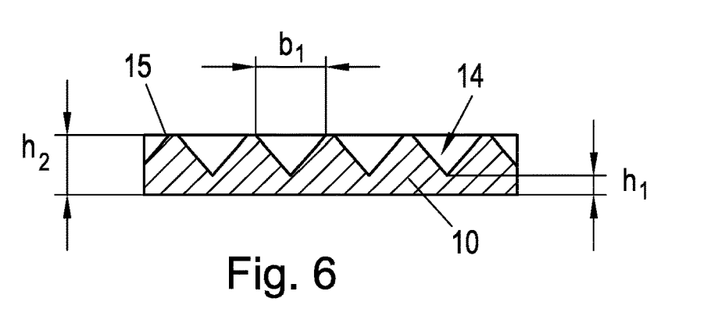

Sealing film no. 6, having a weight per unit area of 50 g/m², has a layer distribution of 1/5/1, each layer 1/5/1 consisting of a mixture of 80% LLDPE C4 and 20% LDPE. The central layer was in addition colored white, although this has no influence at all on the effect according to the present teaching. This results in an overall thickness D of sealing film no. 6, prior to the introduction of the surface structures 14, of 51 µm. The surface structures 14 of sealing film no. 6 are designed as protruding pyramids having a hexagonal base surface and a width $b_1$ of 120 µm (see FIG. 7), the pyramids being oriented so as to be diagonal to the longitudinal direction of the sealing film (as in FIG. 7). Surface structures 14 of this kind also make it possible to achieve a COF of the sealing film 10 with respect to itself that is in the preferred range. Hexagonal surface structures 14 can therefore be considered to be particularly advantageous. In place of hexagons, preferably regular polygons having more than six lateral surfaces could also be used as the base surface. The reason for the lower COF values with respect to itself is considered to be the fact that structures of this kind can slide against one another better and therefore cannot interlock with one another so easily. A similar effect can also be achieved using recessed surface structures 14, as shown in FIGS. 5 and 6.

Some explanations regarding the calculation of the S-value in a multilayer film are set out in the following. As mentioned above, the S-value is calculated by calculating the S-value of each individual layer (content of slip additive in the layer x thickness of the individual layer), and the S-values of the individual layers are added to make the S-value of the film. This is equivalent to determining an average slip additive content of the film in ppm (average of all the layers), weighted according to the layer thicknesses, and multiplying by the overall thickness of the film. In the case of a film having a 1/3/1 layer structure and 100 ppm slip additive in the outer layers S1, S3 and 200 ppm in the central layer S2, an average content of slip additive, weighted according to the layer thicknesses D1, D2, D3, of 160 ppm would result ((100 ppm+3×200 ppm+100 ppm)/5). However, since, according to the present teaching, the sealing film 10 is provided with surface structures 14 and the layers are deformed by the surface structures 14 (see FIGS. 8 and 11), within the meaning of the present teaching the overall thickness D prior to the introduction of the surface structures 14 is used for calculating the S-value. If the overall thickness D of the multilayer sealing film prior to the introduction of the surface structures 14 were 60 µm, an S-value of the sealing film of 60*160=9,600 would result. The same S-value results if the individual S-values of the layers are added together, i.e., 2*60/5*100+60/5*3*200=9,600.

Figure 9:
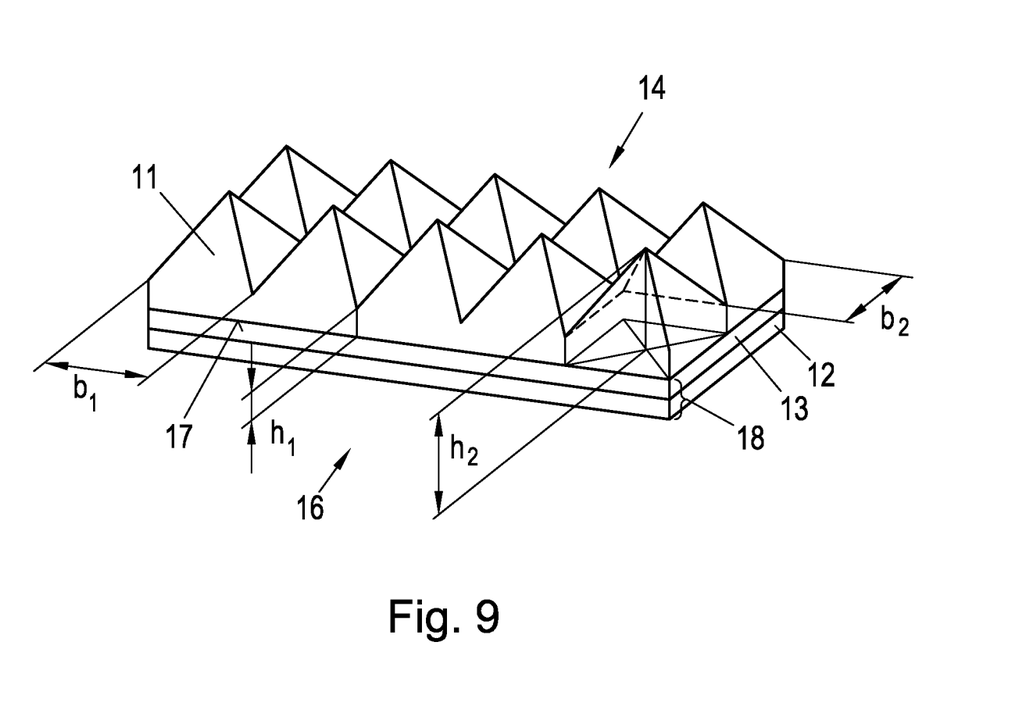
FIG. 9 shows a film laminate comprising a sealing film according to the present teaching.
Figure 10:
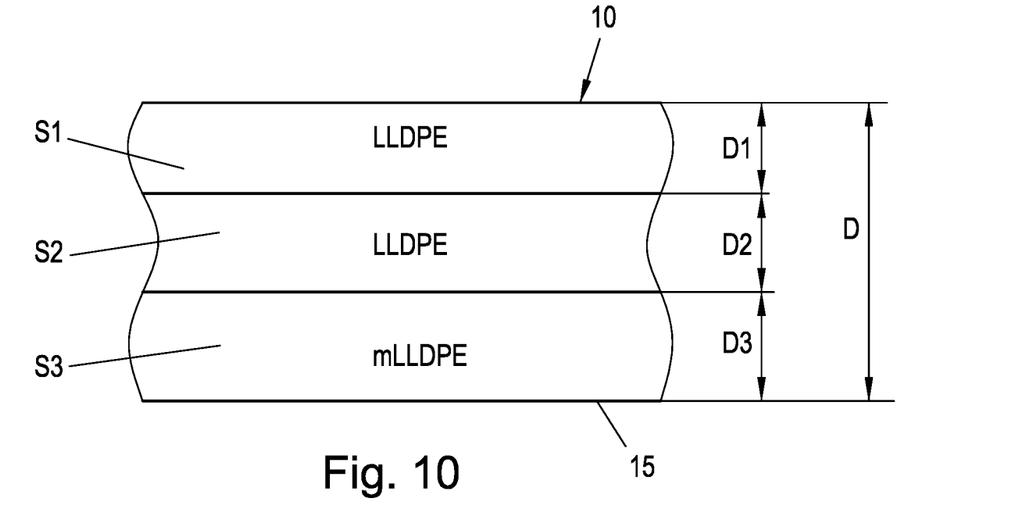
FIG. 10 shows a multilayer sealing film without surface structures.

The sealing film 10 according to the present teaching is preferably used in a film laminate 16 consisting of a, usually printed, base layer 12 made of aluminum, paper or plastics material, and a sealable sealing layer 11 consisting of the sealing film 10, as shown in FIG. 9, for example. For this purpose, the second side 17 of the sealing film 10 that is facing away from the first side 15 of the sealing film 10 comprising the surface structures 14 is bonded to a substrate layer 18 to form the film laminate 16. The sealing layer 11 of course forms one of the outer sides of the film laminate 16. The substrate layer 18 may be single-layer, for example in the form of a base layer 12, or multilayer, for example as a composite structure consisting of a base layer 12 and a barrier layer 13 or other layers. Paper, aluminum or a plastics material can be used as the base layer 12. The barrier layer 13 is an aluminum film or a metallized film, for example. The individual layers of the film laminate 16 are each bonded to one another for example using one adhesive layer in each case (not shown), by means of lamination.

It is likewise conceivable to coextrude the multilayer sealing film 10 directly onto the substrate layer 18. For this purpose, the individual layers S1, S2, S3 of the multilayer sealing film 10 are coextruded or extrusion-coated onto the substrate layer 18, as a molten film, in an extrusion facility.

The slip additive added to the sealing film 10 can also migrate into the substrate layer 18 or into individual layers of the substrate layer 18 in the film laminate 16. This should be taken into account when analyzing a film laminate 16 in order to determine the properties of the sealing film 10. It can be assumed that no or only very little slip additive was present in the adhesive layer and in the substrate layer 18 prior to bonding to the sealing film 10. Irrespective thereof, the substrate layer 18 or the barrier layer 13 is usually significantly thinner than the sealing layer 11, and therefore a slip additive contained therein is usually of no or little consequence. It can therefore be assumed that a slip additive identified in the adhesive layer or in the substrate layer 18 by means of chemical analysis originates from the sealing layer 11. This can then be taken into account when analyzing the sealing film 10 of the sealing layer 11 of a film laminate 16 in order to correctly determine the S-value of the sealing film 10.

The very small quantity of slip additive, according to the present teaching, in the multilayer sealing film 10 is advantageous on account of the slip additives migrating even in the film laminate 16. S-values of over 10,000 in the sealing film 10, as were so far conventional or necessary, are counterproductive, since migration of the slip additives from the sealing layer 11 into the other outer side of the film laminate 16 must then be anticipated. This can in turn trigger the problems, described at the outset, of transporting the film laminate 16 in a packaging facility. The multilayer sealing film 10 according to the present teaching therefore also improves the processability of a film laminate 16 comprising a sealing layer 11 of a sealing film 10 of this kind.

For using the film laminate 16 as packaging, the layer thickness of the base layer 12 is typically in the range of 8 µm to 100 µm, for example 8 µm to 40 µm in the case of BOPET, 15 µm to 40 µm in the case of aluminum, 10 µm to 50 µm in the case of BOPP and up to 100 µm in the case of paper. BOPP or BOPET layers of just 3-4 µm are currently also being tested. The thickness of the sealing layer 11 (thickness D prior to the introduction of the surface structures 14) is typically in the range of 10 µm to 100 µm, preferably in the range of 10 µm to 80 µm, and very particularly advantageously in the range of 20 µm to 70 µm, and the layer thickness of the barrier layer 13 is typically in the range of 6 µm to 25 µm in the case of aluminum or similar to the above-mentioned thicknesses for the base layer 12 in the case of metallized polymer films. It is also conceivable, however, for the barrier layer 13 to be incorporated in the sealing layer 11, e.g., in the form of a PE-EVOH film (polyethylene-ethylene vinyl alcohol copolymer film), as a result of which a separate barrier layer 13 can be omitted. The layer thicknesses of adhesive layers that may be arranged therebetween are typically in the range of from 1 µm to 5 µm. The substrate layer 18 may also comprise other layers, however. It is likewise possible to print the visible side of the substrate layer 18. In the case of a transparent base layer 12 in the substrate layer 18, the layer adjacent to the base layer 12 can also be printed.

Figure 12:
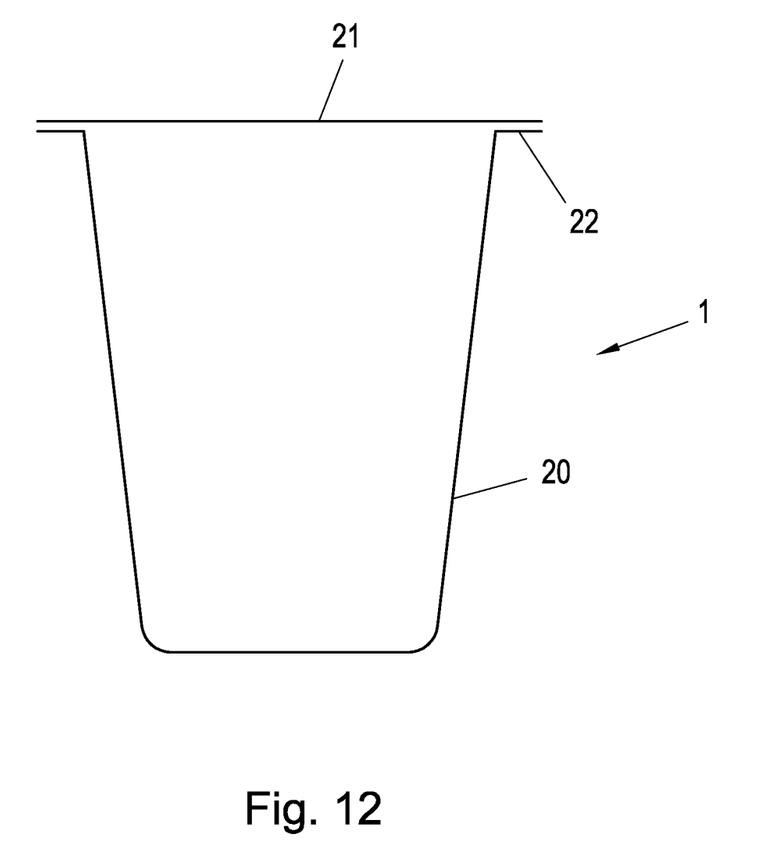
FIG. 12 shows the use of the film laminate according to the present teaching as a closure for a container.

A film laminate 16 of this kind is used for producing packaging for food, animal food or sanitary products, e.g., in the form of bags 1 (FIG. 1) or as membrane-like closures (lids 21) of containers (FIG. 12). For example, the film laminate 16 is folded to form the desired packaging and sealed along sealed seams, as shown for example in FIG. 1, with reference to a bag 1. The film laminate 16 can also be punched in a suitable shape and be used as a lid 21 for closing a container 20, as shown in FIG. 12. For this purpose, the lid 21 is sealed onto a peripheral edge 22 of the container 20. For this purpose, there are in each case commercially available packaging machines for producing packaging of this kind which achieve this, and therefore the process of producing packaging of this kind will not be described in greater detail here. The sealing layer 11 of the film laminate 10 comprises the above-described surface structures 14 at least at the areas at which sealing takes place, as a result of which the COF thus achieved ensures the favorable processability of the film laminate 16 in the relevant packaging machine.

In many applications, such as FFS machines, care should be taken that most of the surface area is provided with the surface structures 14 in the manner according to the present teaching, since otherwise easy sliding relative to the steel surfaces of the machine is not guaranteed.

Individual non-embossed regions, for example for forming customer logos, can, however, be created on the sealing layer 11, and thus on the sealing film 10, provided that said regions are not in the sealing region. Even in the case of completely continuous surface structures 14, design features of this kind can be produced by varying the surface structures 14 and thus varying the gloss level after introducing the surface structures 14. Said features could then also be located in the sealing region without having a disruptive effect.

However, the surface structures 14 also result in improved compressibility of the film laminate 16, as a result of which the sealing process is also assisted at overlap areas of a plurality of sealed seams 2, 3 (as shown by way of example in FIG. 1). Manufacturing-related differences in thickness in the sealing region can also be compensated in this way. As a result, adjacent film laminates 16 that are pressed together are better compressed in the event of sealing between sealing jaws 9a, 9b, as a result of which the formation of air channels 4 in the overlap region or leakiness in the sealing region can be at least reduced, ideally prevented. At the same time, the film laminate 16 according to the present teaching ensures that the optical appearance of the packaging, in particular on the visible side of the packaging, is not impaired, since the surface structures 14 are sufficiently small not to be perceived as disruptive when viewed with the naked eye. Owing to the small dimensions of the surface structures 14 of the sealing layer 11 (in particular the thicknesses), said structures also do not press through on the visible side of the film laminate 16, i.e., on the outside of the packaging.

Since such embossed sealing films 10 of the sealing layer 11, for example consisting of PE, can also be produced by means of flat film extrusion, which is currently possible only for glossy PP films, PE raw materials having a higher MFI (melt flow index) can also be used. The improved flowability of the film material 16 can additionally support the closure of the air channels upon sealing or the prevention of leakiness at the sealing seam.

The effect of the multilayer sealing film 10 according to the present teaching in a film laminate 16 upon sealing will be explained with reference to an example in the form of bags 1. For this purpose bags 1, as shown in FIG. 1, were produced with a film laminate A and a film laminate B using a commercially available packaging machine, in this case what is known as a vertical form fill seal machine (vertical FFS), and the tightness of the bags produced in this way was subsequently tested. The sealing temperature $T_Q$ of the sealing of the transverse seam 3 and the sealing time $t_s$ was varied, in order to determine, for each sealing temperature $T_Q$, the minimum sealing time $t_s$ for the greatest productivity, as the number A of bags produced per minute. The sealing time $t_s$ influences the cycle time $t_z$, i.e., the time required for producing one bag. The sealing temperature of the longitudinal seam 2 was kept the same, at 160° C. In each case, for each set of parameters, 30 packages were produced and tested for tightness.

The testing for tightness was carried out in a water bath at a negative pressure of 650 mbar. For this purpose, the bags are under water and the air above the water is evacuated to reach the negative pressure. As a result, the residual air trapped in the bags expands and, in the case of damage, causes the sealed seam to fail, which can be seen from air bubbles emerging in the water.

A conventional laminate comprising a BOPET base layer 12 having a layer thickness of 12 μm and a sealing layer 11 adhesively bonded thereto and consisting of a multilayer sealing layer 10 according to sealing film no. 3 in Table 1 was used as film laminate A.

A laminate comprising a BOPET base layer 12 having a layer thickness of 12 μm and a multilayer sealing film according to the present teaching in accordance with sealing film no. 6 in Table 1 adhesively bonded thereto was used as film laminate B. Owing to the surface structures 14, said sealing layer 11 has a COF with respect to steel (static/dynamic) of 0.25/0.24, even without any slip additives such as ESA and without antiblock additives. As a result, the COF of film laminate B according to the present teaching is in the range desired for processing films of this kind in conventional packaging machines. As confirmation, neither were any problems in this respect observed in processing during the following tests while processing in a packaging machine in the form of a vertical form fill seal (vFFS) facility.

The results of these tests are shown in Table 2.

TABLE 2

| $t_s$ [s] | $t_s$ [s] | A | $t_Q$ [° C.] | Film laminate A (comparison) Pack tightness | Film laminate B (invention) Pack tightness |
| --- | --- | --- | --- | --- | --- |
| 0.30 | 0.55 | 109 | 150° C. | 60% | 83% |
| 0.25 | 0.5 | 120 | 160° C. | 90% | 97% |
| 0.20 | 0.45 | 133 | 165° C. | 23% | 97% |
| 0.25 | 0.5 | 120 | 165° C. | 100% | 100% |
| 0.20 | 0.45 | 133 | 170° C. | 23% | 97% |

As can be seen in Table 2, the sealing time $t_s$ can be shortened in the case of a film laminate B according to the present teaching, which is also directly reflected in the number A of bags that can be produced per minute. This is achieved using an inexpensive raw material (LLDPE C4) and a smaller amount of material. This is all the more remarkable since the film composition of the sealing layer 11 has not yet been optimized in any manner. The effect results simply from the improved compressibility owing to the surface structures 14 in the sealing layer 11.

In particular, when using the film laminate 16 to produce bags, the advantage results that the surface structures 14 are arranged facing the filling material. The surface structures 14 can thus reduce or prevent adhesion of filling material, for example, or can improve the emptying of the bag.

The invention claimed is:

1. A multilayer sealing film comprising a sealable polymer, wherein,
surface structures provided on a first side of the multilayer sealing film in areas where sealing takes place increase compressibility of the multilayer sealing film, such that during sealing adjoining multilayer sealing films are pressed together and compressed to avoid formation of air channels, and
the multilayer sealing film has a thickness prior to introduction of the surface structures in a range of 10 μm to 100 μm, and
a total of the S-values for each layer of the multilayer sealing film is less than 10,000, the S-value of each layer defined as a product of a thickness of the layer in micrometer and an amount of slip additive in the layer in parts per million, and
the multilayer sealing film has a COF relative to steel of dynamically less than 0.3, with the side comprising the surface structures, irrespective of an addition of an antiblock additive to the multilayer sealing film.

2. The multilayer sealing film according to claim 1, wherein, as a result of the surface structures, a greatest thickness of the multilayer sealing film is at least 10% greater than a smallest thickness of the multilayer sealing film, and a greatest lateral extension of the surface structures is less than 500 μm.

3. The multilayer sealing film according to claim 2, wherein the greatest thickness of the multilayer sealing film is at most 300% greater than the smallest thickness of the multilayer sealing film.

4. The multilayer sealing film according to claim 2, wherein the greatest lateral extension of the surface structures is less than 400 μm.

5. The multilayer sealing film according to claim 1, wherein the multilayer sealing film is manufactured without adding a slip additive.

6. The multilayer sealing film according to claim 1, wherein the surface structures are oriented so as to be diagonal to a longitudinal direction of the multilayer sealing film.

7. The multilayer sealing film according to claim 1, wherein the surface structures are formed so as to protrude from the first side of the multilayer sealing film.

8. The multilayer sealing film according to claim 1, wherein the surface structures are formed as depressions on the first side of the multilayer sealing film.

9. The multilayer sealing film according to claim 1, wherein the surface structures are formed having a base surface in the shape of a polygon comprising at least six sides.

10. The multilayer sealing film according to claim 1, wherein regions without surface structures or having different surface structures, in particular in the form of a logo or inscription, are provided in the multilayer sealing film, on the side comprising the surface structures.

11. The multilayer sealing film according to claim 1, wherein the multilayer sealing film comprises a polyethylene film produced in a blown film extrusion or flat film extrusion method.

12. The multilayer sealing film according to claim 1, wherein the multilayer sealing film is free of antiblock additives.

13. A film laminate comprising
a substrate layer, and
a multilayer sealing film according to claim 1 that forms a multilayer sealing layer,
wherein the surface structures are formed on the first side of the multilayer sealing film and the opposing second side of the multilayer sealing film is bonded to the substrate layer.

14. The film laminate according to claim 13, wherein the substrate layer and the sealing layer are bonded to one another by means of an adhesive layer.

15. The film laminate according to claim 13, wherein the sealing layer is extruded onto the substrate layer.

16. The film laminate according to claim 13, wherein the substrate layer comprises a base layer.

17. The film laminate according to claim 13, wherein the substrate layer comprises a base layer and a barrier layer, the barrier layer being arranged between the base layer and the sealing layer.

18. A packaging produced from a film laminate according to claim 13, wherein the packaging is produced by folding and sealing the film laminate.

19. The packaging according to claim 18, characterized in that the folding and sealing results in overlapping sealed seams, in that surface structures are formed on the multilayer sealing film at least at regions at which sealing takes place, and in that, upon sealing, adjacent film laminates comprising the multilayer sealing film are pressed together and compressed, in particular in the overlap region of a plurality of sealed seams, in order to prevent the formation of air channels in the overlap region.

20. A packaging produced using a film laminate according to claim 13, wherein the packaging is formed as a container comprising a peripheral edge onto which a lid produced from the film laminate is sealed.

* * * * *